(No Model.) H. STAGGS. CULTIVATOR.
No. 401,468. Patented Apr. 16, 1889.
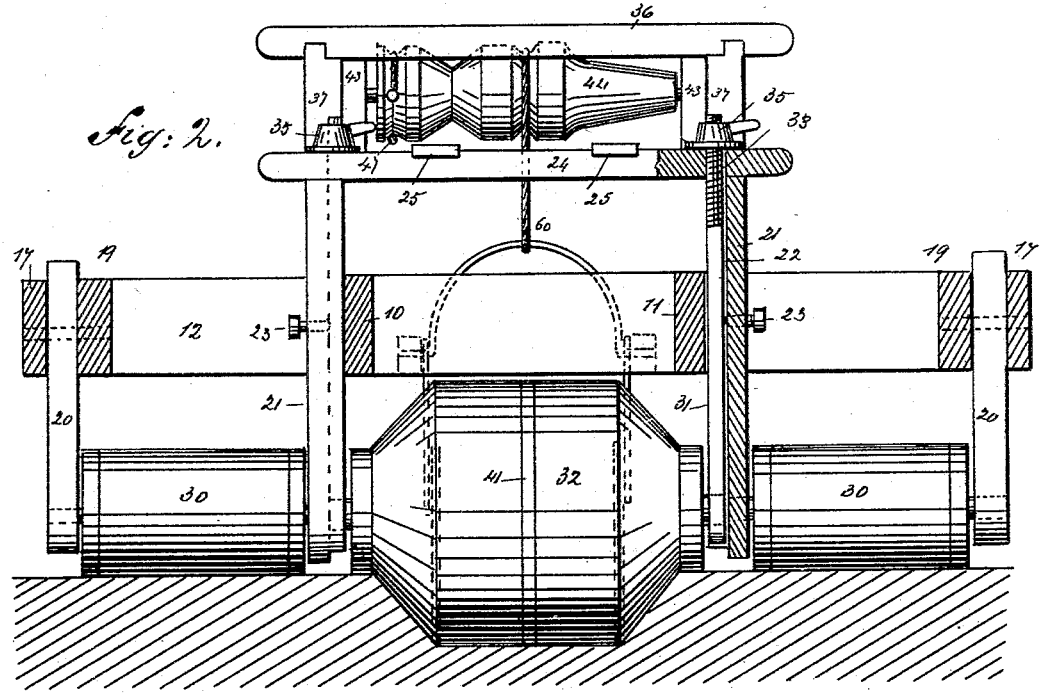
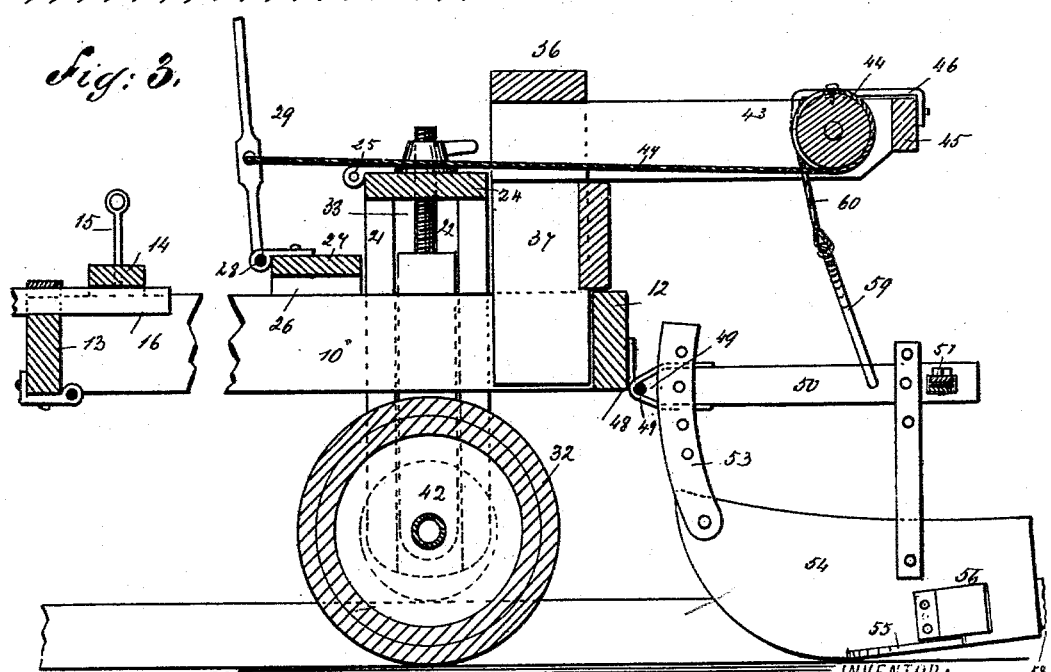

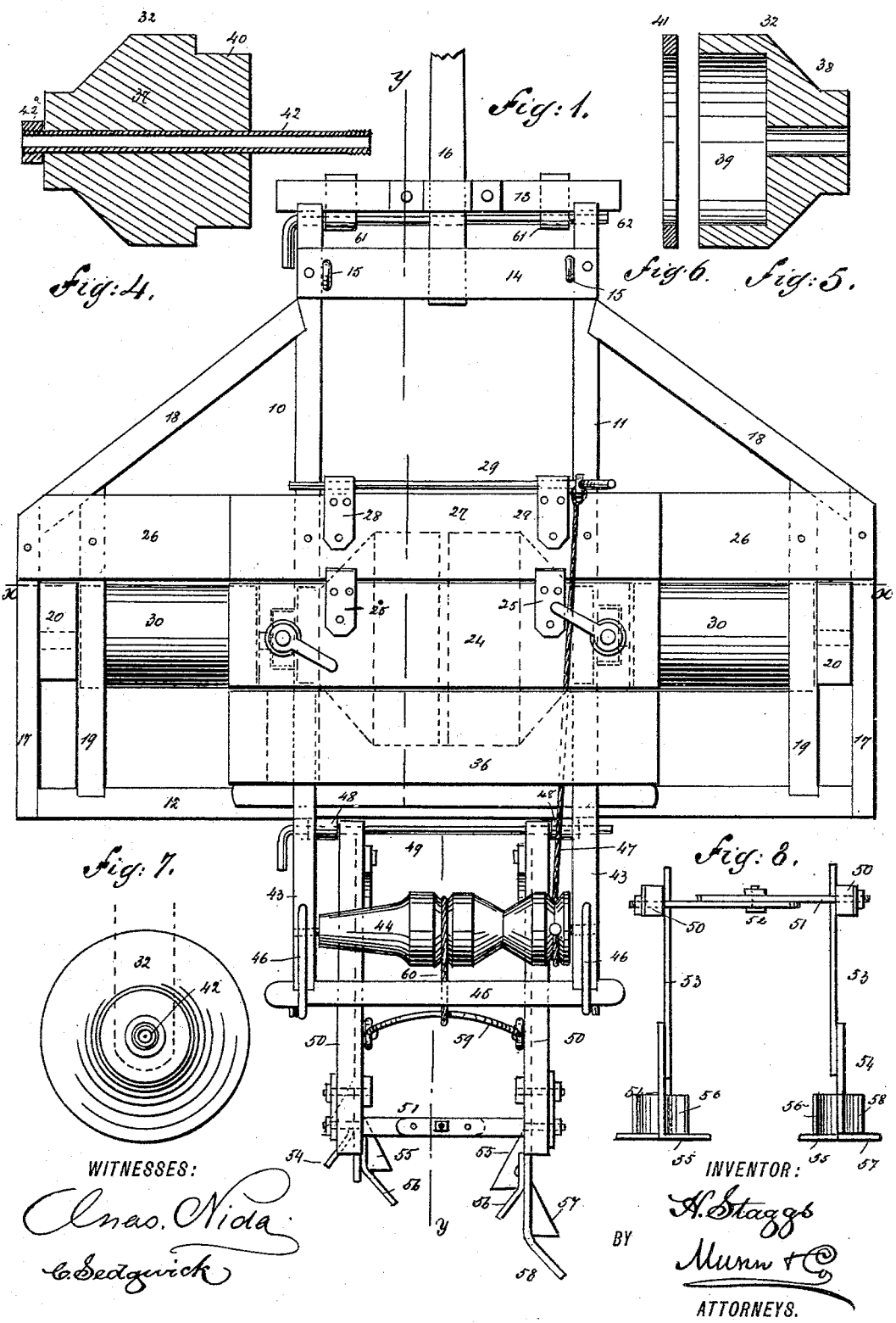

UNITED STATES PATENT OFFICE.

HARRISON STAGGS, OF NEAR VALENCIA, KANSAS.

CULTIVATOR.

SPECIFICATION forming part of Letters Patent No. 401,468, dated April 16, 1889.

Application filed October 3, 1888. Serial No. 287,108. (No model.)

*To all whom it may concern:*

Be it known that I, HARRISON STAGGS, residing near Valencia, in the county of Shawnee and State of Kansas, have invented a new and Improved Cultivator, of which the following is a full, clear, and exact description.

My invention relates to an improved roller-cultivator specially adapted for use with listed corn or other plants growing in furrows, and has for its object to provide an implement of simple and durable construction which will crush the clods in the furrows as well as upon the ridges and leave the soil and trash in the same position as when left by the listing-plow or any other furrow implement.

The further object of the invention is to provide an implement which may be used to cultivate listed corn when just appearing or when five or six inches high, and also an implement which may be adjusted to furrows of different width or depth.

The invention consists in the construction and combination of the several parts, as will be fully described hereinafter, and then pointed out in the claims.

Reference is to be had to the accompanying drawings, forming a part of this specification, in which similar figures of reference indicate corresponding parts in all the views.

Figure 1 is a plan view of the implement. Fig. 2 is a transverse section on line $x\ x$ of Fig. 1. Fig. 3 is a longitudinal section on line $y\ y$ of Fig. 1. Figs. 4, 5, and 6 are detail views of the furrow-rollers. Fig. 7 is an end view of the same, and Fig. 8 is a rear elevation of the cultivator-blade and supporting-frame.

In carrying out the invention the frame consists of two parallel-spaced beams, 10 and 11, extending longitudinally, or in direction of the length of the machine, mortised in or otherwise secured to a rear transverse beam, 12, extending at each side beyond the longitudinal beams, as best shown in Fig. 1. The front ends of the longitudinal beams are connected by a bar, 13, and provided with a cross-bar, 14, upon the upper surface near said end bar. Near the extremities of the said cross-bar vertical eyes 15 are secured, and the tongue 16 is usually made to bear upon the under face of the cross-bar and pass through a clip or strap upon the front end bar, as best shown in Figs. 1 and 3. Short beams 17 are fastened in any approved manner to the extremities of the rear beams, 12, the forward ends of which beams 17 are connected with the outer surface of the longitudinal beams 10 and 11 by diagonal brace-beams 18. A second short beam, 19, is fixed in the frame parallel with the side beams 17, and between said side beams, 17 and 19, the upper end of a downwardly-extending perpendicular standard, 20, is secured by means of a bolt or equivalent device, whereby the said standards may be readily detached when desired.

To the outer face of each longitudinal beam 10 and 11 of the frame a standard, 21, is firmly attached, which standards are in transverse alignment with the standard 20 and extend downward an equal distance. The standards 21 project above the frame-beams 10 and 11, and are provided upon the inner face with a longitudinal groove, 22, and a set-screw, 23, passing from the outside through the standards into said groove, preferably at a point opposite the beams 10 and 11, as best illustrated in Fig. 2.

A cross-head, 24, connects the two intermediate standards, 21, at the top, provided with spaced knuckles 25, extending over the forward edge. Short transverse timbers 26 connect the respective central beams, 10 and 11, of the frame and the contiguous side beams, 17 and 19, and upon the upper face of the said timbers 26 another timber, 27, or a bar is secured, spanning the space intervening the approaching ends of the timber 26. The timber 27 is located parallel with, below, and in advance of the cross-head 24 and provided with spaced knuckles 28, in which one member of an angle or elbow lever, 29, is journaled, the said lever being readily detachable.

The standards 20 and 21 are preferably made of metal or hard wood, and are ordinarily so attached to the frame that their lower ends will be about eighteen inches above the level surface of the ground and twenty-four inches above the bottom of the furrow.

In the opposing faces of the end and intermediate standards, 20 and 21, ridge-rollers 30, of any approved construction, are journaled, and in the grooves 22 of the intermediate standards, 21, a metal bearing, 31, is held to slide, a furrow-roller, 32, being journaled in the lower ends of the said bearings. The upper end of the bearings is reduced and threaded, as illustrated at 33 in Figs. 2 and 3, and the said threaded end is carried upward through the cross-head 24, and is provided with a thumb or other nut, 35, or other forms of locking device. The driver's seat 36 is located above and to the rear of the cross-head, being supported by suitable standards, 37, attached to the rear beam, 12, of the frame. The cross-head 24, when the driver is seated, serves as a rest for the feet.

The furrow-roller 32 is constructed, preferably, in two sections, 37 and 38, the section 38 being provided with an annular recess, 39, adapted to receive a tongue, 40, integral with the approaching side of the section 37, as illustrated in Figs. 4 and 5. When it is desired to elongate the furrow-rollers 32, a metal ring, 41, or a series of such rings is passed over the tongue 40, and the uncovered portion of the said tongue is inserted in the recess 39 of the section 38, the two sections being held together by a spindle, 42, passing through the same, having threaded extremities and suitable lock-nuts, 42$^a$, screwed thereon. In Fig. 2 the roller is illustrated as elongated the thickness of one ring.

From the standards supporting the driver's seat two horizontal arms, 43, are rearwardly extended, and between the said arms a drum, 44, is journaled. The drum 44 is detachable from the said arms, and to that end the contiguous faces of the arms at the outer end are provided with a longitudinal groove adapted to receive the spindles of the drum, at the inner end of which grooves a slight depression is formed. The outer ends of the arms 43 are connected by a bar, 45, which bar is held in position by hooks 46, pivoted in the upper face of the arm and passing over the bar 45 to engagement with the rear face thereof, as best illustrated in Fig. 1. A rope or chain, 47, is attached at one end of the drum 44, which rope or chain is attached at the other end to the angle-lever 29.

At each side of the center of the rear frame-beam, 12, knuckles 48 are secured, through which knuckles a detachable pin, 49, is passed. Upon the pin 49 one end of the spaced plow-beams 50 is pivoted, the opposite end of the said beams being connected by overlapping apertured rods 51, as best shown in Figs. 1 and 8, and the two rods 51 are held in contact by a suitable bolt, 52.

Downwardly and outwardly curved plates 53 are adjustably secured to the inner faces of the several plow-beams 50, near the inner end of the same, and to the lower end of the said plates 53 a vertical cultivator-blade, 54, is pivoted. The cultivator-blade upon the left-hand side is bent upon itself at the bottom and carried inward in the form of a triangle, as best illustrated at 55 in Fig. 1, and above the said triangular share 55 an essentially right-angled blade or scraper, 56, is rigidly secured to the inner face of the cultivator-blade. The approaching face of the opposite cultivator-blade is similarly provided with a triangular share and an angle scraper.

The triangular shares and scraper-blades are duplicated upon the outer side of the body-plates 53, the several sets upon each plate being arranged one in advance of the other, as illustrated at 56 and 58. The two cultivator-blades are adjusted vertically by means of a yoke, 59, pivoted to the several beams 50, which yoke is connected with the drum 44 by a rope or chain, 60, as best shown in Figs. 1 and 2.

If in practice it is found desirable, the drag-plows or cultivator-blades may be removed from the rear of the cultivator and attached at the front knuckles, 61, a pin, 62, being provided for that purpose and held in engagement with the front bar, 13, of the frame.

It is obvious that by reason of the standards carrying rollers being at the elevation set forth above the level of the ground and also above the furrows any trash accumulated in the road of the implement will not be disturbed. If the corn is over an inch or two high, the furrow-roller is elevated as high as desirable; or, by unscrewing the thumb-nuts 35, the bearings 31 and the roller 32 may be entirely disengaged or removed from the implement.

If it is desirable to substitute other forms of ridge-rollers for those illustrated—for instance, a screw-roller for cutting weeds—the rollers 30 may be removed by disengaging the outer standards, 20, from the frame, and should the implement be used for cultivating corn upon level ground the furrow-roller 32 may be detached from its bearings and a straight roller substituted of the same diameter of the ridge-rollers. The rollers may be made of wood, iron, or stone.

By means of the lever 29 the drag-plows may be elevated in turning corners, and when the said drag-plows are located at the front of the implement the drum 44 is preferably journaled in the eyes 15 and the lever 29 is located in the knuckles 25 of the cross-head 24.

It is necessary for the perfect working of the machine that the axis of the rollers be in exact longitudinal alignment, and it is further necessary that the center or furrow roller be made vertically adjustable. The frame as constructed is exceedingly strong and affords a perfect carriage for the rollers, and the peculiar construction of the drag-plows renders them most effective in practice.

Having thus described my invention, what I claim as new, and desire to secure by Letters Patent, is—

1. The combination, with a frame, transversely-aligning standards secured thereto, and ridge-rollers journaled between the outer and intermediate standards, of bearings held to vertically slide in the contiguous faces of the intermediate standards, and an extensible furrow-roller journaled in said sliding standards, as and for the purpose specified.

2. The combination, with a frame and transversely-aligning standards secured thereto between the outer and intermediate standards, of bearings held to vertically slide in the contiguous faces of the intermediate standards and an extensible and removable furrow-roller journaled in said sliding bearings, drag-plows detachably pivoted to the frame, a rotary drum connected with the said plow, and a lever connected with said drum, substantially as shown and described.

3. The combination, with a frame and transversely-aligning standards secured thereto between the outer and intermediate standards, of bearings held to vertically slide in the contiguous faces of the intermediate standards and an extensible and removable furrow-roller journaled in said sliding bearings, drag-plows detachably pivoted to the frame and consisting of parallel beams, vertical blades adjustably attached to said beams, triangular shares horizontally extending from the bottom of the blades, and vertical scrapers attached to the face of the blades contiguous to the shares, and means, substantially as shown and described, for elevating the said drag-plows, as and for the purpose specified.

4. In a cultivator, a frame consisting of longitudinal central beams, 10 and 11, the rear transverse beam, 12, the spaced side beams, 17 and 19, the front beam, 13, diagonal brace-beams 18, connecting the side and center beams, vertically and downwardly projecting standards attached to the side beams, 17 and 19, and similar horizontally-aligning standards, 21, secured to the outer faces of the central longitudinal beams, 10 and 11, all combined for operation substantially as shown and described.

5. The combination, with the frame and the horizontally-aligned ridge-rollers journaled thereto, of the separate and independent vertically-adjustable furrow-roller between the ridge-rollers, substantially as set forth.

6. The combination, with the frame and the horizontally-aligned ridge-rollers journaled thereon, of an extensible vertically-adjustable separate and independent furrow-roller between the inner ends of said ridge-rollers, substantially as set forth.

7. In a cultivator, a furrow-roller consisting of two sections, 37 38, the inner end of one section having its inner end reduced or rabbeted to form a tongue, 40, and a recess, 39, in the inner end of the outer section, receiving said tongue, and the intermediate ring fitting on said tongue, the outer faces or peripheries of said sections and ring being flush to present an unbroken surface, substantially as set forth.

HARRISON STAGGS.

Witnesses:
FRED. B. RUSSELL,
BENJ. F. CUTLER.